United States Patent
Xie

(10) Patent No.: US 8,512,890 B2
(45) Date of Patent: Aug. 20, 2013

(54) LITHIUM ION CELL WITH COOLING FEATURES

(75) Inventor: Oliver Xie, Lansdale, PA (US)

(73) Assignee: Bren-Tronics Batteries International, L.L.C., Commack, NY (US)

(*) Notice: Subject to any disclaimer, the term of this patent is extended or adjusted under 35 U.S.C. 154(b) by 0 days.

(21) Appl. No.: 13/290,765

(22) Filed: Nov. 7, 2011

(65) Prior Publication Data

US 2013/0115505 A1    May 9, 2013

(51) Int. Cl.
 *H01M 10/02* (2006.01)
(52) U.S. Cl.
 USPC ........................................................ 429/120
(58) Field of Classification Search
 None
 See application file for complete search history.

(56) References Cited

U.S. PATENT DOCUMENTS

| | | | |
|---|---|---|---|
| 2003/0129488 A1* | 7/2003 | Gross | 429/185 |
| 2007/0026303 A1* | 2/2007 | Jeon et al. | 429/143 |
| 2007/0172725 A1* | 7/2007 | Doshi | 429/120 |
| 2008/0299449 A1* | 12/2008 | Yun et al. | 429/120 |

* cited by examiner

*Primary Examiner* — Patrick Ryan
*Assistant Examiner* — Wyatt McConnell
(74) *Attorney, Agent, or Firm* — Keusey & Associates, P.C.

(57) ABSTRACT

Provided herein are prismatic cell assemblies having a continuous cooling channel therethrough. Methods of manufacture of the cell assembly are also provided, wherein each of a series of stacked substantially planar components selected from cathodes, separators, and anodes includes a through hole, and wherein the through holes are concentrically aligned with the adjacent component before securing the assembly using an elongated tube to form a continuous cooling channel through the components. The methods further include inserting the secured stacked components into a pouch having sidewall openings aligned with the continuous cooling channel, and sealing the sidewall openings so that the pouch can be filled with electrolyte without leaking any electrolyte into the cooling channel, or leaking through the pouch sidewall.

20 Claims, 7 Drawing Sheets

LITHIUM ION CELL WITH COOLING FEATURES

FIELD OF INVENTION

The present application relates to lithium ion cells that include internal cooling features, and to methods of manufacturing such cells.

BACKGROUND

The use of large format lithium ion cells in the assembly of energy storage systems simplifies system complexity, and improves system reliability. In prismatic format configurations, the number of components is reduced as compared to other cell formats. Because of the relatively large size of the cells, however, problems can be encountered with heat buildup within each cell, which degrades the cell and reduces cell life.

For these reasons and more, it would be beneficial to provide a battery cell with structures and features that allow internal heat generated by the cells to be transferred away from the cells.

SUMMARY

Provided herein are apparatus and methods for cooling of energy storing devices such as batteries. In some embodiments, the energy storing devices are lithium ion cells. In one embodiment, a prismatic cell apparatus is provided comprising a plurality of cells, wherein the cells comprise substantially planar anodes, cathodes, and separators, each of the anodes, cathodes, and separators having a through hole therein, wherein the through holes are configured and aligned to collectively form a continuous channel though the cells, the continuous channel oriented substantially perpendicular to the plane of each anode and cathode.

Also provided herein are methods of manufacturing or assembling energy storage devices such as prismatic cells. In one example, the methods include the steps of providing a generally planar anode having a first through hole, the first through hole having a first diameter; providing a generally planar cathode having a second through hole, the second through hole having a second diameter; providing a generally planar separator having a third through hole, the third through hole having a third diameter; stacking the separator between the anode and the cathode to thereby form a stack, such that the first, second, and third holes are generally aligned, preferably concentric, with each other. The method further includes inserting a bushing tube through the first, second and third holes, the bushing tube having a flanged first end, and an opposite second end. The method includes securing a connector, such as a ring, to the second end of the bushing tube to secure the stack as a unit. Optionally, the methods further include inserting the stack into a pouch, the pouch having a first pouch opening aligned with the flanged first end and a second pouch opening aligned with the second end of the bushing tube, and sealing the first and second openings to the first and seconds ends of the bushing tube to form a leakproof pouched cell having a continuous cooling channel therethrough.

Further, the present invention provides a prismatic cell manufactured according to the methods herein. In one example, the process includes providing a generally planar anode having a first hole, the first hole having a first diameter; providing a generally planar cathode having a second hole, the second hole having a second diameter; providing a generally planar separator having a third hole, the third hole having a third diameter; stacking the separator between the anode and the cathode to thereby form a stack, such that the first, second, and third holes are generally concentric with each other. The method further includes inserting a heat conductive tube through the first, second and third holes, the tube having a first end, and an opposite second end, and securing the first and second end of the tube to form a secure cell stack. The method optionally includes inserting the stack into a pouch, the pouch having a first pouch opening aligned with the first end of the tube and a second pouch opening aligned with second end of the tube, and sealing the pouch to the tube to form a pouched cell having a continuous cooling channel therethrough.

Additionally, provided herein is a battery comprised of a first plurality of cells aligned in a first row. Each of the first plurality of cells has a hole extending therethrough. A second plurality of cells is aligned in a second row. Each of the second plurality of cells has a hole extending therethrough. A heat exchanger assembly extends through the holes in the first row and the holes in the second row to form a substantially continuous cooling loop for removing heat from the cells.

Further provided herein are methods of manufacturing a battery cell. In one embodiment, the steps include forming a through hole in each of a plurality of positive electrodes, negative electrodes, and separator sheets; alternating the positive electrodes and negative electrodes and placing a separator sheet between each adjacent positive electrode and negative electrode such that the through holes are aligned, inserting an elongate tube through the aligned holes, and securing the ends of the tube to thereby form a connected cell stack having a cooling channel therethrough. Optionally, the methods include inserting the connected cell stack into a pouch. Optionally, the pouch includes at least two openings, each aligned with the cooling channel of the cell stack. Optionally, the method further includes sealing the pouch openings to provide a leakproof pouched cell assembly having a cooling channel therethrough. Optionally, the method includes connecting a series of pouched assemblies, and inserting a heat exchange medium into the cooling channel.

Other examples and embodiments will be evident from the written description and figures hereof.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings certain embodiments of the present invention. It should be understood, however, that the invention is not limited to the precise arrangements and instrumentalities shown. In the drawings, the same reference numerals are employed for designating the same elements throughout the several figures.

DETAILED DESCRIPTION OF THE PREFERRED EMBODIMENTS

Figure 1:
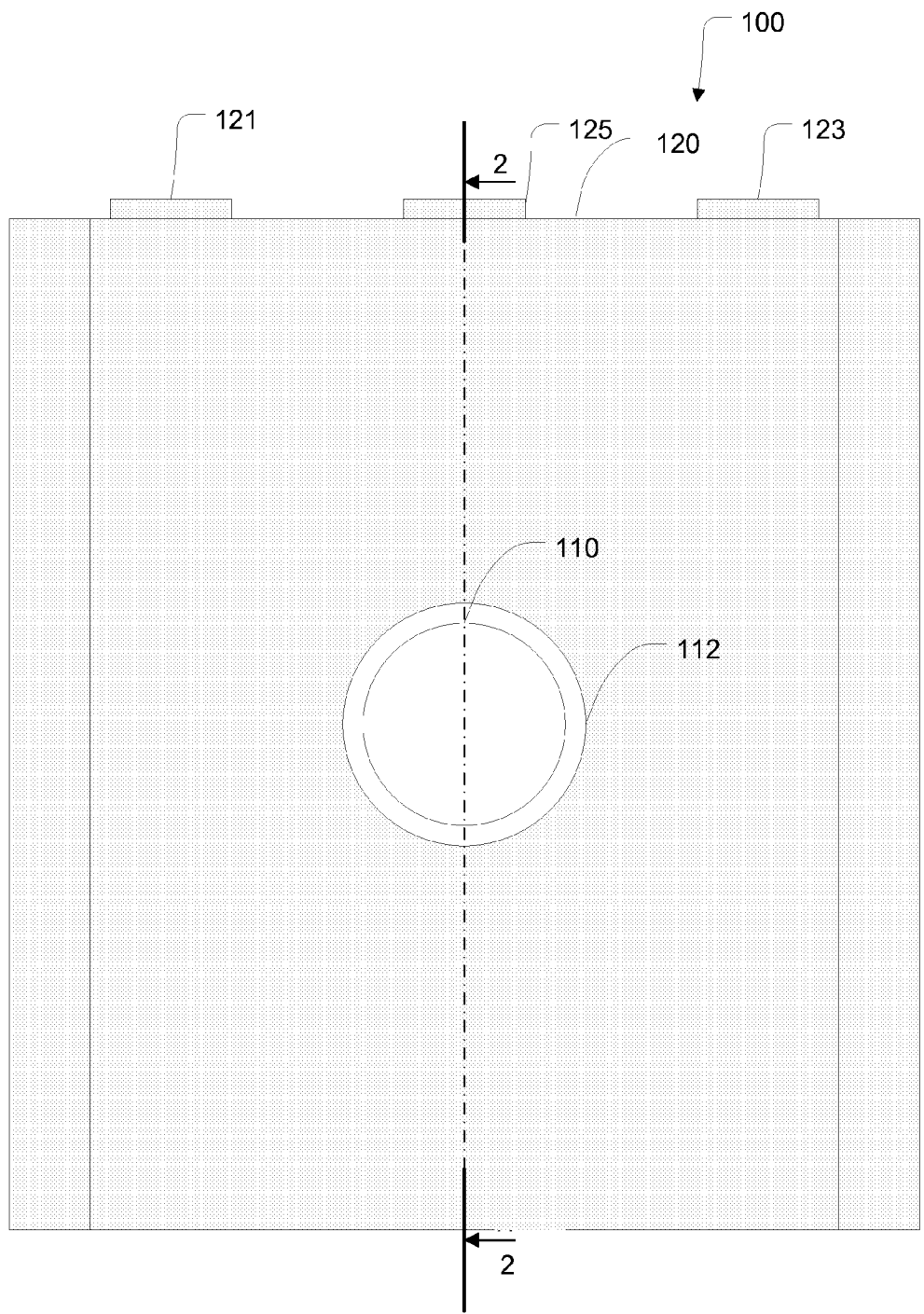
FIG. 1 is front view of a cell pouch for a lithium ion cell according to an exemplary embodiment of the present invention.

In describing the embodiments herein and as illustrated in the drawings, specific terminology will be used for the sake of clarity. However, the scope is not intended to be limited to the specific terms so selected, it being understood that each specific term includes all technical equivalents operating in similar manner to accomplish similar purpose. It is understood that the drawings are not drawn exactly to scale. In the drawings, similar reference numbers are used for designating similar elements throughout the several figures. The following describes particular embodiments of the present invention.

During operation, lithium ion cells generate heat as a result of the chemical reaction inside the cell that produces electricity. The heat within each cell forms a temperature gradient throughout the cell, resulting in high temperature gradients throughout the interior of the cell that affect the performance and life cycle of the cell. The present invention provides apparatus and methods to conducts heat from within the cell to reduce the temperature gradient. For example, a plurality of cells can be aligned with each other such that a common channel or conduit is formed through the aligned cells, forming a stack having a cooling channel therethrough to conduct heat away from the cells. In general, heat generated by electrical current and electro-chemical reaction is conducted as much as 50 times better in the planar direction of generally flat, stacked electrodes as compared to heat conducted in the stacking direction. Additionally, electrical conduction in the stacking direction is facilitated by good contact, especially with any outer housing case applying pressure to the pouched cells. In some examples herein, electrodes and components are separated by gaps between the pouch and the stack, and between the pouch and any outer housing or case. The present inventions remedy the fact that, in known stacked cells, the more heat-conductive direction is not utilized to dissipate heat. Heat from the center of any stack is very difficult to conduct out, which contributes to higher cell temperatures. The higher temperature in the center of the cell further facilitates higher current flow due to accelerated chemical reaction process. The present methods and apparatus provides a hole structure that is very beneficial to lower the total temperature of the cell, and even the temperature gradient throughout the cell. Further, the electrolyte around the hole structure provides a contact source by filling any gaps, thereby improving heat transfer.

Provided herein are prismatic cell assemblies having a continuous cooling channel therethrough. Methods of manufacture of the cell assembly are also provided, wherein each of a series of stacked substantially planar components selected from cathodes, separators, and anodes includes a through hole, and wherein the through holes are concentrically aligned with the adjacent component before securing the assembly using an elongated tube to form a continuous cooling channel through the components. The methods further include inserting the secured stacked components into a pouch having sidewall openings aligned with the continuous cooling channel, and sealing the sidewall openings so that the pouch can be filled with electrolyte without leaking any electrolyte into the cooling channel, or leaking through the pouch sidewall.

Referring to FIGS. 1-4, a lithium ion cell 150 according to an exemplary embodiment of the present invention generally includes a cell pouch 100 having a plurality of alternating generally planar cathodes 104 and generally planar anodes 106, each separated by a non-electrically conducting generally planar separator 108, forming an electrode stack 109. As used herein, "generally planar" means the structure includes at least one portion that lies in a planar orientation and is large enough to accommodate a through hole oriented substantially perpendicular to the plane. By way of non-limiting example, flat sheets of metal would be considered "generally planar" as used herein, regardless of whether they also included bent portions, and regardless of peripheral shape around the flat portion. In the non-limiting examples shown in FIGS. 2-4, the generally planar anodes 106, cathodes 106, and separators 108 are shown as uniformly flat structures, and are aligned in substantially vertical planes parallel with one another. The orientation of the generally planar structures can be vertical, horizontal, or other orientation, so long as the through holes in each structure can be aligned with the adjacent structure.

In the example of FIGS. 1-4, each of the anodes 104, cathodes 106, and separators 108 has a circular through hole 104H, 106H, 108H, respectively, such that the centers of the holes 104H, 106H, 108H are substantially aligned and concentric with each other, thereby forming a channel passage 111. The size of the holes 104H, 106H and 108H are adapted to provide adequate cooling, without unduly sacrificing surface area for other desirable and necessary uses within the cell, such as electrical energy storage and conduction. In an exemplary embodiment wherein the cathode 104 and anode 106 have a cross sectional profile of greater than at least about 2 inches by 2 inches, the diameter of the cathode hole 104H is about 1 3/16" (about 3 centimeters), an exemplary diameter of the anode hole 106H is about 1 1/8" (about 2.9 centimeters), and an exemplary diameter of the separator hole 108H is about 1 1/16" (about 2.7 centimeters). In an exemplary embodiment, holes 104H, 106H, 108H are provided during formation of the cathode 104, anode 106, and separator 108, such as by stamping or punching of a through hole generally in a middle portion of each respective anode 104, cathode 106, and separator 108. In other embodiments, the holes 104H, 106H, 108H are provided after assembly, such as by drilling, boring, or stamping. In any embodiment, the holes 104H, 106H, 108H collectively form an open-ended channel, the channel compatible with the insertion of a heat exchange element, as further described herein.

Figure 2:
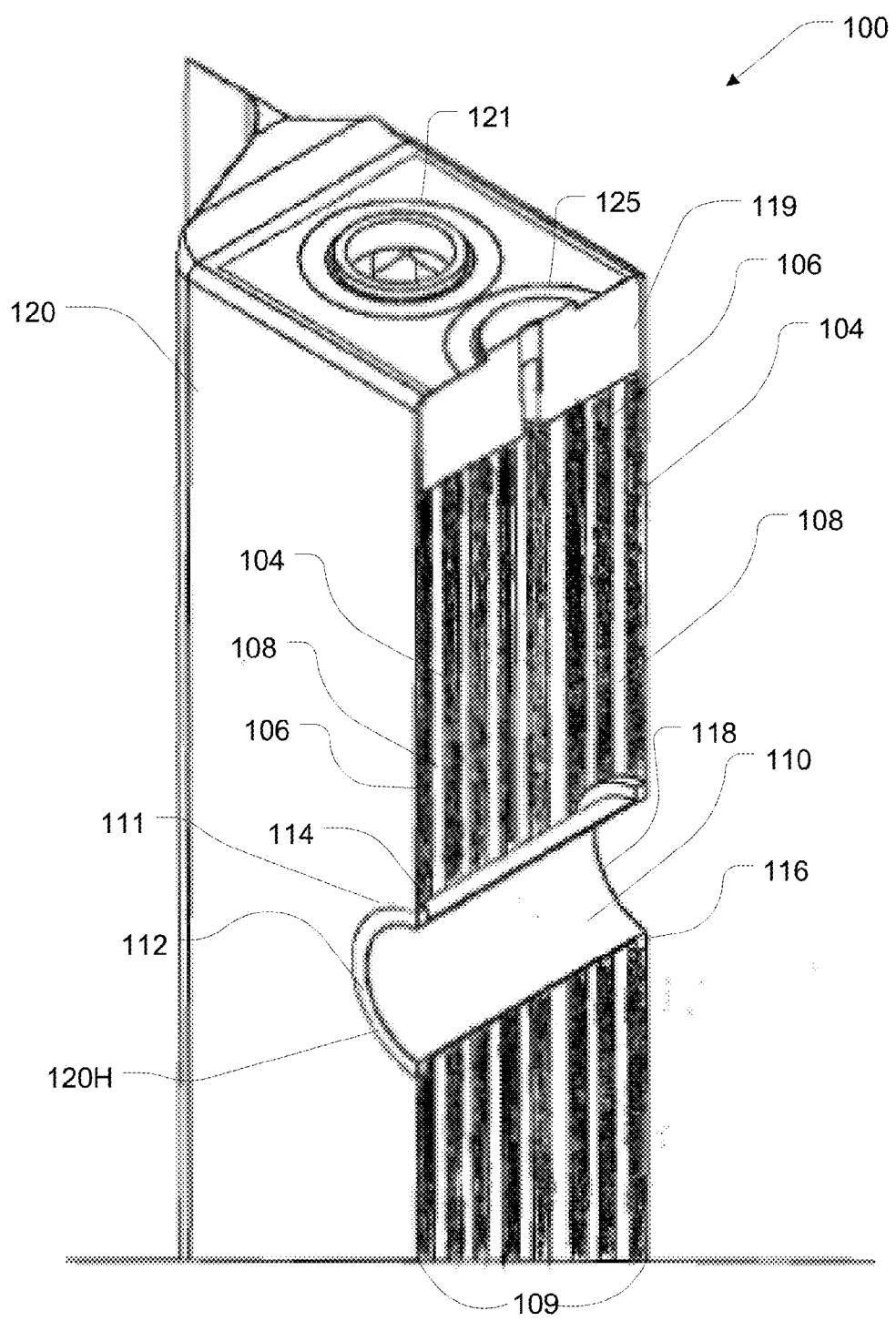
FIG. 2 is a sectional view of the cell pouch of FIG. 1, taken along lines 2-2 of FIG. 1.
Figure 3:
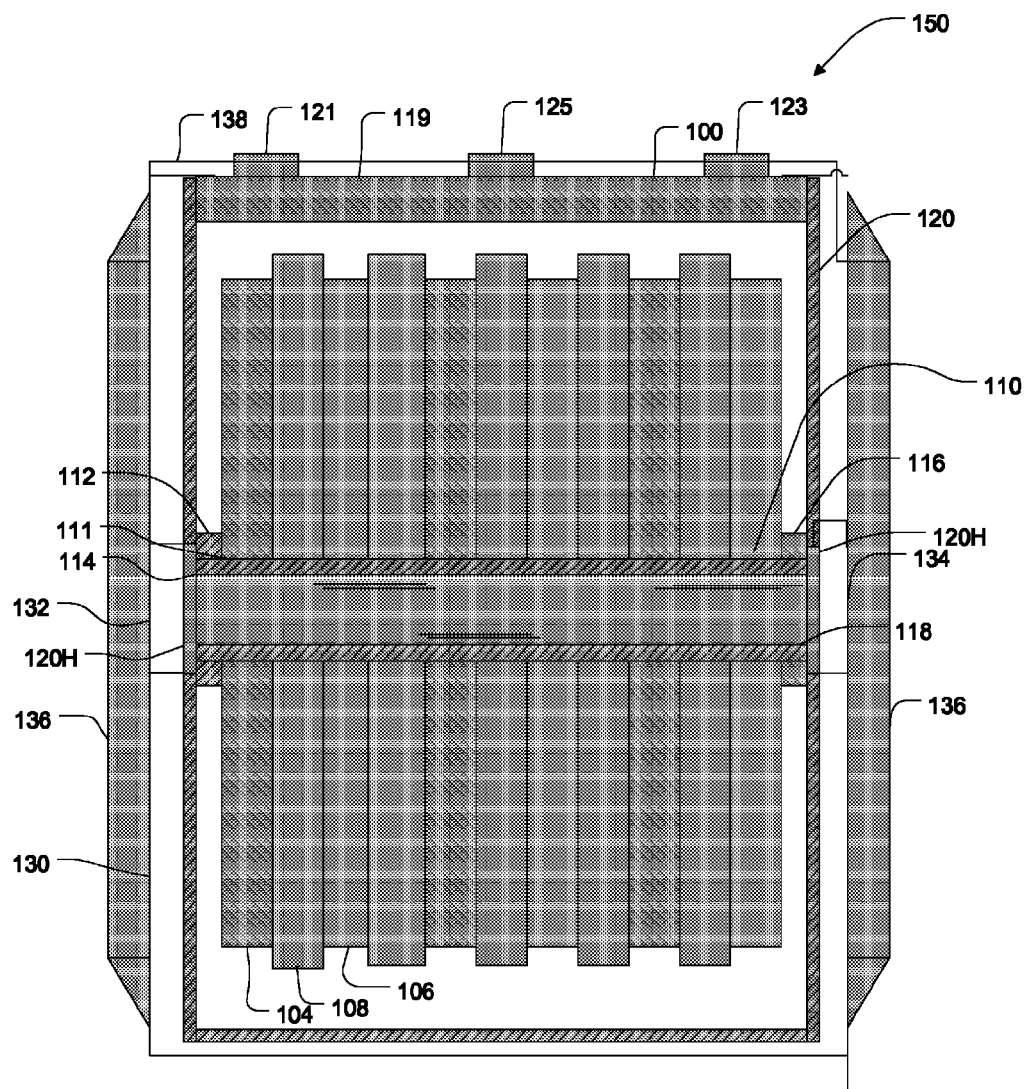
FIG. 3 is a sectional view of a lithium ion cell using the cell pouch of FIGS. 1 and 2.
Figure 4:
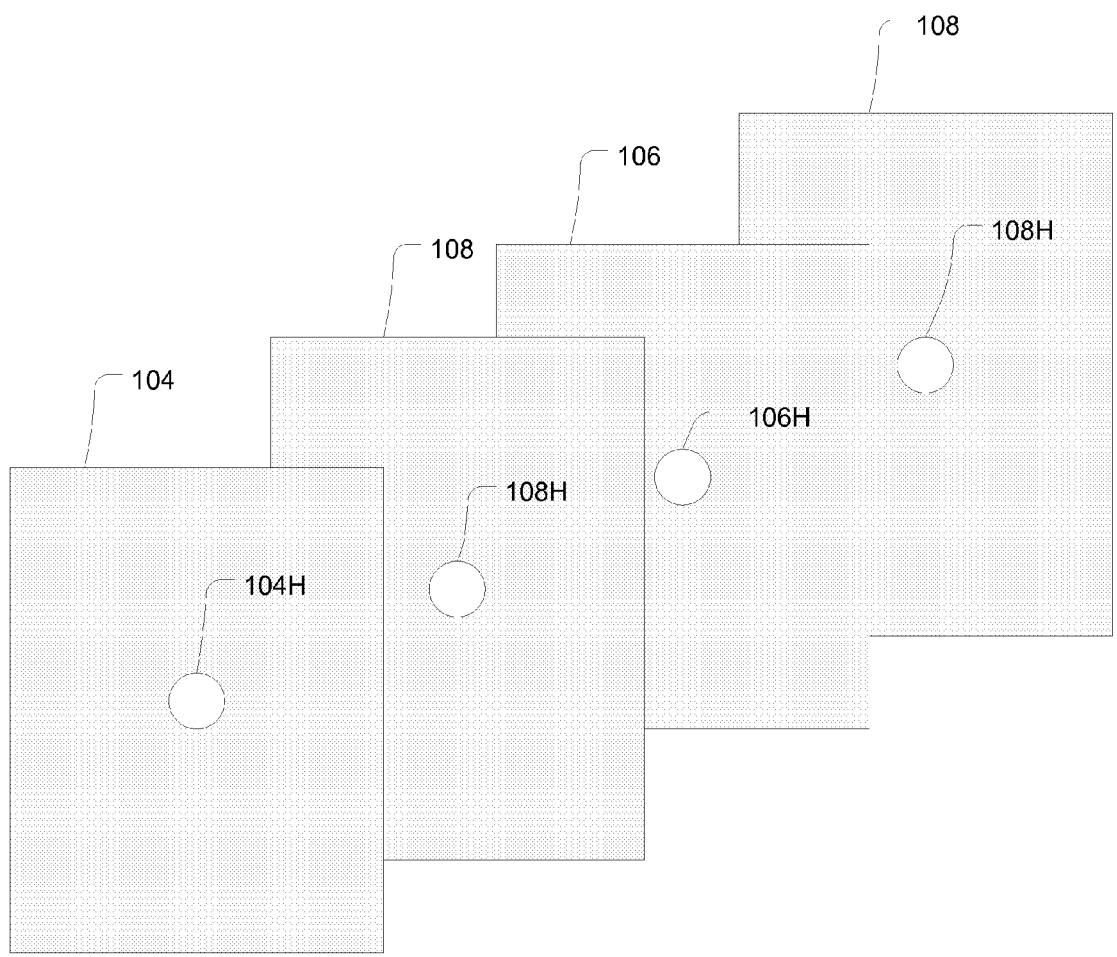
FIG. 4 is an exploded view of a cell stack used in the lithium ion cell of FIGS. 1 and 2.

Exemplary cooling channels and heat exchange elements are now described. As shown in FIGS. 2-3, in some examples, a heat exchange element comprises an elongate bushing tube 110. In this example, the bushing tube 110 includes a first flange 112 on a first end 114 of the bushing tube 110. The elongate bushing tube 110 is configured to extend longitudinally through the passage 111 formed by the holes 104H, 106H, 108H of an assembled series of cathodes 104, anodes, 106 and separators 108. In an exemplary embodiment consistent with the previous example of described above, the bushing tube 110 has a 1 inch inner diameter and is constructed from a thermally conductive but electrically insulating material, such as CoolPoly® D5108 polymer, manufactured by Cool Polymers, Inc. of North Kingstown, R.I.

In this example, after the bushing tube 110 is inserted through the passage 111, a second flange 116 is connected to the inserted second end 118 of the bushing tube 110, such as by heat sealing or chemical reaction or adhesive, to the second end 118 of the bushing tube 110. The connection of the second flange 116 to the second end 118 of the bushing tube 110 in this example seals the series of anodes 106, cathodes 104 and separators 108 to form an electrode stack 109 securely connected by the bushing tube 110, including by its first flange 112 and second flange 116. While the present example uses flanges 112 and 116, any external diameter-increasing appurtenance or device can be provided on or secured to the ends of the tube 110 to secure the cell stack 109 therebetween.

Optionally, next the electrode stack 109 and bushing tube 110 assembly are inserted into a pouch. In one example, the assembly has a continuous cooling channel therethrough, the channel formed in part by the interior of the hollow bushing tube 110, and is inserted into a pouch or housing. In the example shown in FIG. 3, a pouch 120, such as an aluminum foil pouch, is provided. The pouch is selected to be compatible with the cell both in size and composition, as well as with concern for generated heat during operation, and for the containing of electrolyte within the cell without undesired leakage, and especially without leakage into the cooling channel.

In one example, the pouch 120 generally includes opposed through holes 120H through its side wall(s). In an example consistent with the examples of previously described herein, the holes 120H are about 1 inch in diameter, and are aligned with the flanges 112. The pouch 120 is then sealed to both flanges 112 to provide a leak proof pouched battery cell. Various methods and apparatus for sealing the pouch 120 to the flanges 112 are compatible. In one example generally shown in FIG. 9, the pouch 120 and flanges 112 are placed in a desired contact position, and are then sealed together by exposure to ultrasonic frequency/frequencies. Alternatively or additionally, mechanical methods are used to seal the pouch 120 to any of the flanges 112. For example, in one example the sealing is accomplished using a flexible sealing apparatus such as an O-ring, and then placing a fastener such as retainer clip or ring 116 on the inner and/or outer surface of the pouch 120 to engage the flange 112. The O-ring contacts the sidewall of pouch 120, and thereby acts as a sealing surface. The O-ring also acts as a non-abrasive cushion to prevent the fastener such as ring 116 and/or flanges 112 from tearing the pouch 120. In still other examples, the pouch 120 can be sealed to a flange 112 using a permanent adhesive, application of heat, or other chemical or mechanical means that are compatible with the materials that comprise the flanges 112, ring 116 and pouch 120, as well as any electrolyte or other any other chemical or component contained within the sealed, pouched battery cell or that exists in any environment to which the sealed pouched cell is exposed in operation, storage, transport, or otherwise.

Importantly, the methods described above and elsewhere herein provide for inserting a secured stack of anode and cathode electrodes, separators, and other cell components into a pouch having opposed sidewall openings aligned with the continuous cooling channel. Upon securing of the pouch sidewalls to the bushing, flange, ring, or other terminal portions of the stack adjacent the cooling channel, a secure, leakproof seal is formed around the pouch sidewall openings so that the pouch can be filled with electrolyte (whether liquid, solid, powdered, gas, or otherwise) without leaking any electrolyte into the cooling channel, or leaking through the pouch sidewall.

As shown in FIGS. 2-3, a top portion 119, having a positive terminal 121, a negative terminal 123, and a vent 125, is located over the top of the electrode stack 109 and sealed to the pouch 120, forming a sealed cell pouch 100 with a cooling passage therethrough, the passage generally defined by the bushing tube 110. After sealing the pouch 100 to flanges 112, or ring 116, an electrolyte (not shown) is added to pouch 100. In one example, the electrolyte may be inserted into the pouch 120 through the vent 125. The sealed cell pouch 100 is then inserted into a prismatic housing 130 (shown in FIG. 3) having openings 132, 134 therethrough. The openings 132, 134 are aligned with the bushing tube 110, thereby defining a cooling passage through the entire battery cell 150. Optionally, thermal conducting fins 136 extend along the sides of housing 130 to further assist in transmitting heat away from cell 150. A cap 138 is located over housing 130 to seal housing 130, allowing terminals 121, 123 and vent 125 to protrude through cap 138.

Figure 5:
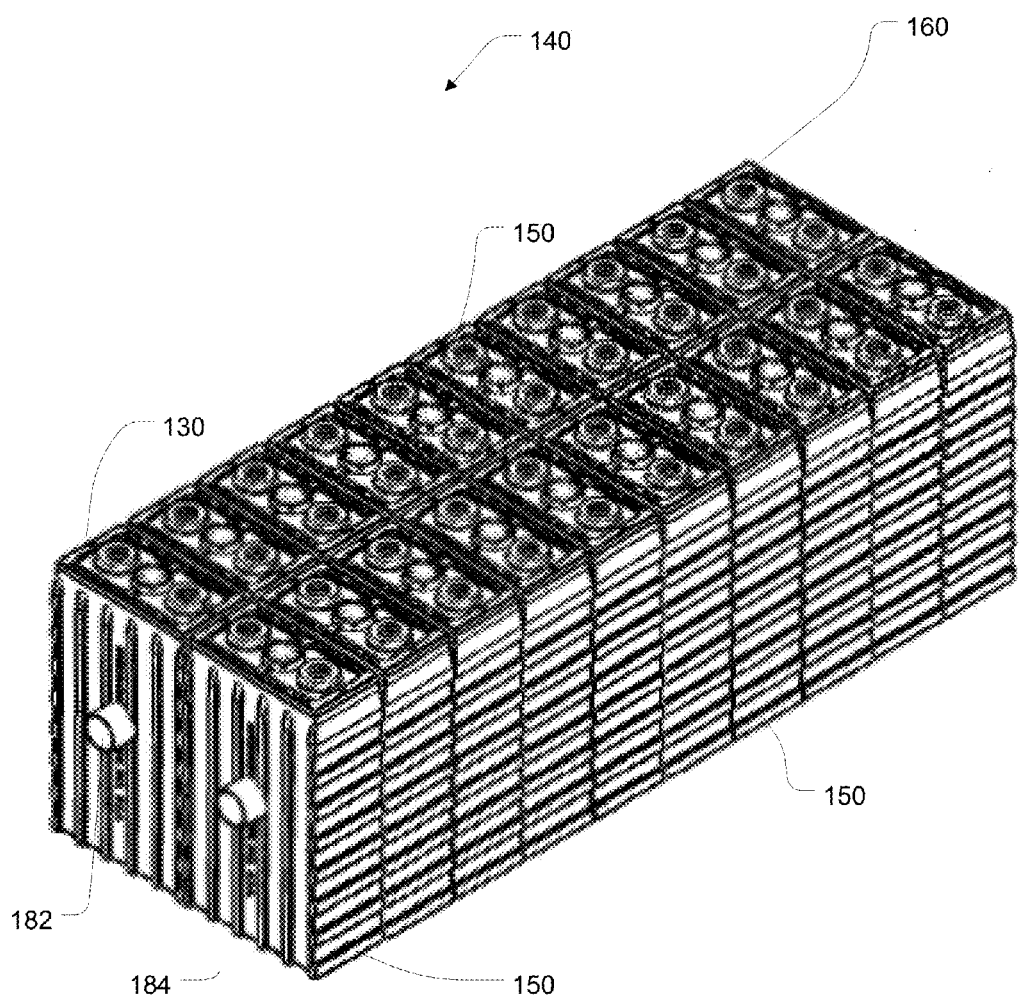
FIG. 5 is a perspective view of a battery formed from a plurality of cells of FIG. 1.
Figure 6:
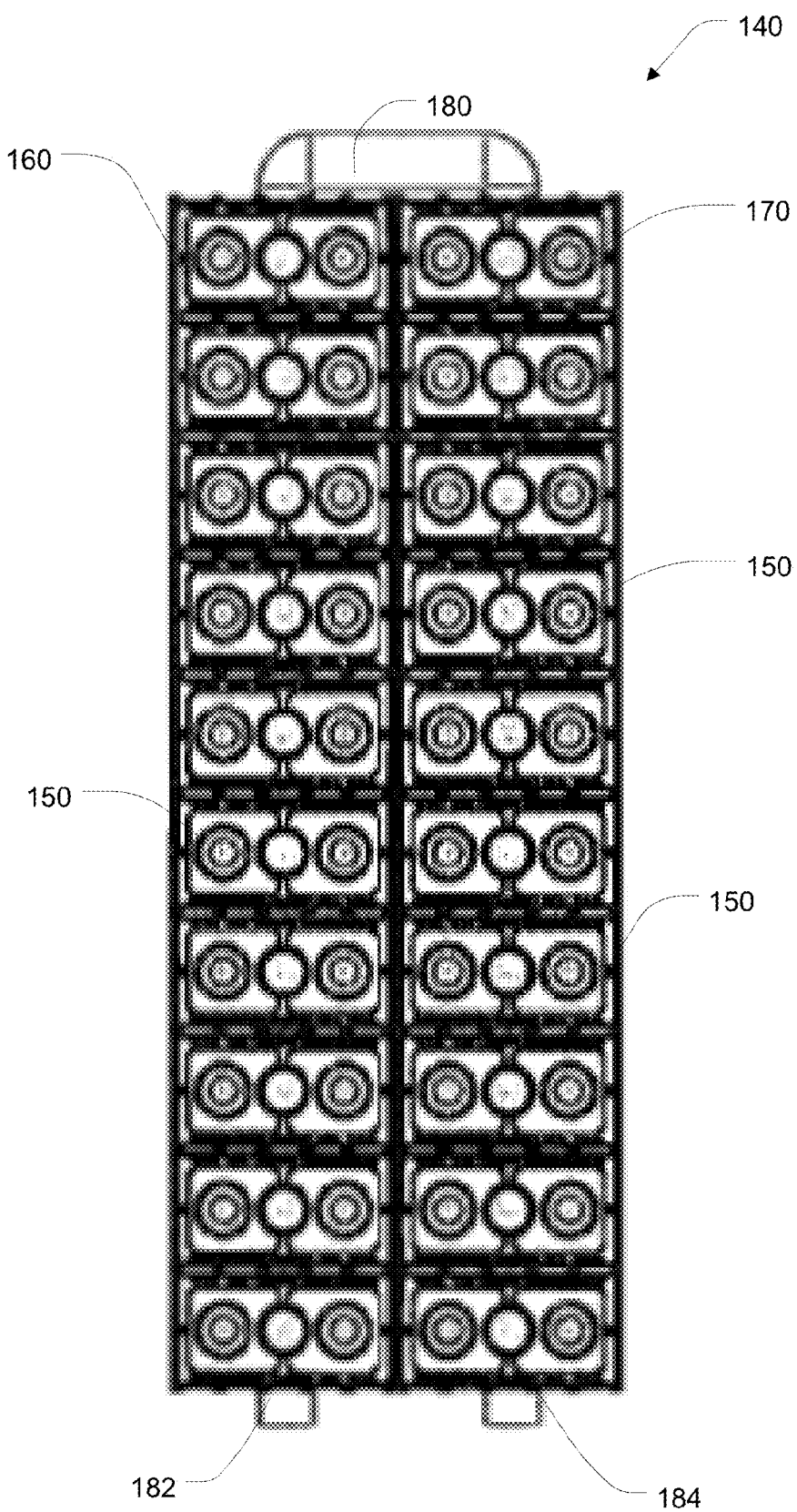
FIG. 6 is a top plan view of the battery of FIG. 4.

Further provided herein are interconnected cells and housings that together form a prismatic energy storing device having cooling features therein. Referring to FIGS. 5-6, a battery assembly 140 is comprised of a first plurality of battery cells 150 that are aligned in a first row 160, with all of the bushing tubes 110 generally aligned with each other to form continuous cooling channels throughout each row, and among rows. For example, a second plurality of battery cells 150 is aligned in a second row 170, next to the first row 160, with all of the bushing tubes 110 aligned with each other. A heat exchanger, such as in the form of a generally U-shaped heat exchanger tube 180, is inserted to connect the bushing tubes 110 between rows. For example, a first end 182 of the U-shaped heat exchanger tube 180 connects with the terminal end of a bushing tube 110 of first row 160, and the opposite second end 184 of the tube 180 connects to the terminal end of a bushing tube 110 of the second row 170. A continuous cooling loop is created by connecting all rows with other rows, and then connecting or inserting into the loop a heat exchange apparatus such as a water pump, reservoir, or other fluid heat exchange device. For example, a manifold (not shown) can be provided to connect the loop to cooling fluid (not shown), such as, for example, air, water, or ethylene glycol. In a preferred embodiment, a cooling fluid enters the tube 180 through first end 182, passes through tube 180, and exits second end 184, before entering another heat exchanger tube 110 and passing through each such connected pouched cell in the assembly 150 until the fluid has passed through the loop and back to the manifold before cycling back to the battery stack. In this manner, the circulation of fluid through the cell stacks conducts heat away from the center of the battery cells 150, such as during operation of the battery 140.

While a generally U-shaped tube 180 is used in the exemplary embodiment, those skilled in the art will recognize that other shapes for the tube 180 may be used. For example, a first straight tube (not shown) may pass through the first row 160 and a second straight tube (not shown) may pass through the second row 170. First ends of each of the tubes may be connected to a cooling fluid supply manifold and second ends of each of the tubes may be connected to a cooling fluid discharge manifold. Additionally or alternatively, flexible heat exchange tubing may be used and bent or otherwise formed to connect rows of stacked cells, housings, and other elements of the loop in a preferably continuous and leak proof manner. Alternatively, other configurations of heat exchangers may be used in conjunction with the battery 150.

Figure 7:
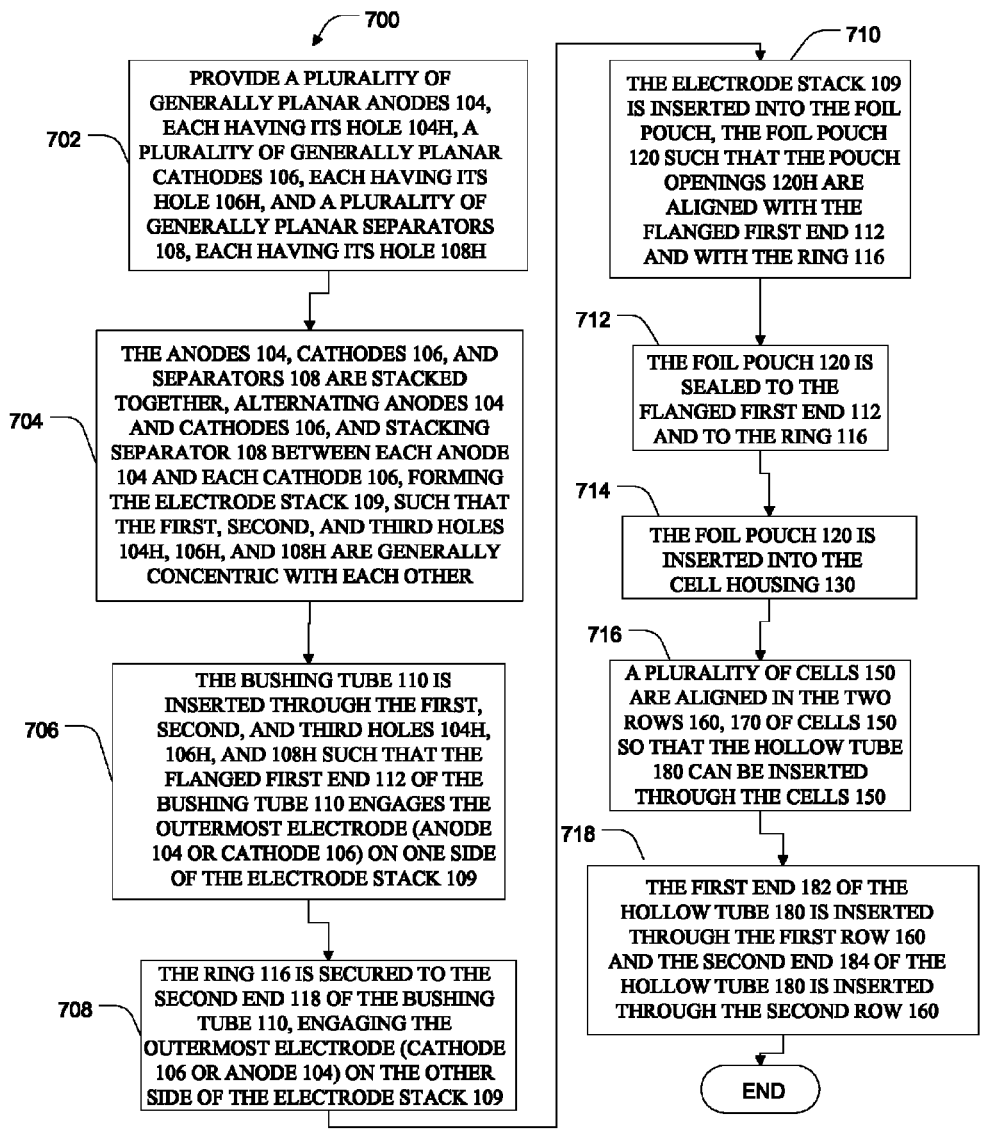
FIG. 7 is a flowchart illustrating an exemplary embodiment of a method for manufacturing the cell of FIG. 3.

For example, referring to flowchart 700 in FIG. 7, in step 702, a plurality of generally planar anodes 104, each having its hole 104H, a plurality of generally planar cathodes 106, each having its hole 106H, and a plurality of generally planar separators 108, each having its hole 108H, are provided. In step 704, the anodes 104, cathodes 106, and separators 108 are stacked together, alternating anodes 104 and cathodes 106, and stacking separator 108 between each anode 104 and each cathode 106, forming the electrode stack 109, such that the first, second, and third holes 104H, 106H, and 108H are generally concentric with each other.

In step 706, the bushing tube 110 is inserted through the first, second, and third holes 104H, 106H, and 108H such that the flanged first end 112 of the bushing tube 110 engages the outermost electrode (anode 104 or cathode 106) on one side of the electrode stack 109 and in step 708, the ring 116 is secured to the second end 118 of the bushing tube 110, engaging the outermost electrode (cathode 106 or anode 104) on the other side of the electrode stack 109. In step 710, the electrode stack 109 is inserted into the foil pouch, the foil pouch 120 such that the pouch openings 120H are aligned with the flanged first end 112 and with the ring 116. In step 712, the foil pouch 120 is sealed to the flanged first end 112 and to the ring 116. In step 714, the foil pouch 120 is inserted into the cell housing 130.

In step 716, a plurality of cells 150 are aligned in the two rows 160, 170 of cells 150 so that the hollow tube 180 can be inserted through the cells 150 and in step 718, the first end 182 of the hollow tube 180 is inserted through the first row 160 and the second end 184 of the hollow tube 180 is inserted through the second row 160.

In a comparative temperature analysis between a prior art cell and a similarly sized and power cell of the present invention, the actual internal temperature of the prior art cell was about 80 degrees Celsius, while a calculated internal temperature of the inventive cell was about 45 degrees Celsius. All other factors being equal in two compared cell stacks, it is therefore expected that the centralized cooling features described herein will lower operating temperatures by more than 25 degrees Celsius, and/or by more than about 40%. These results can further be enhanced by selection of materials comprising the centralized cooling system, such as the thermal heat transfer capacities of the tubes 110, 180 and any manifolds, cooling fluids, heat exchangers, and other components to provide a centrally cooled battery assembly.

In an alternative embodiment where the weight of the battery 140 is not a critical issue, such as, for example, in a ground-based or otherwise stationary system, instead of a hollow tube through which cooling fluid passes, a solid heat conductive rod or similar elongated mass (not shown) may be used. The solid mass may optionally be placed inside an electrically non-conductive tube 180, such as a bushing tube 110. In an exemplary embodiment, the solid heat conducting mass may be copper, aluminum, or some other relatively high heat conducting material. The solid heat conducting mass, although possibly less efficient than the cooling fluid, could eliminate the need for a circulating cooling fluid system, which eliminates the possibility of cooling fluid leaks.

In yet another embodiment, the tube 180 may further include a hollow interior channel, the channel having an irregular shape designed to yield a high surface area for excellent heat exchange. The interior chamber is bounded by an irregular chamber sidewall. In one example, the chamber sidewall is the interior surface of a hollow heat exchange tube 180. In another example, the chamber sidewall is the interior surface of a hollow insert that is placed inside of the bushing tube 180.

While the principles of the invention have been described above in connection with preferred embodiments, it is to be clearly understood that this description is made only by way of example and not as a limitation of the scope of the invention.

The invention claimed is:

1. An energy storing apparatus comprising a plurality of cells, wherein the cells comprise substantially planar anodes, cathodes, and separators, wherein each of the anodes, cathodes, and separators have at least one through hole therein, wherein each through hole is configured and aligned to collectively form a continuous channel though the cell, and wherein the longitudinal axis of the continuous channel is oriented substantially perpendicular to the plane of each anode and cathode, and further comprising a heat exchanger tube protruding through the continuous channel.

2. The apparatus of claim 1, wherein the heat exchanger tube is hollow.

3. The apparatus of claim 1, wherein the heat exchanger tube is solid.

4. The apparatus of claim 1, further comprising a pouch surrounding the cell, wherein the pouch comprises a sidewall having at least a first sidewall opening and an opposite second sidewall opening therein, the sidewall openings configured and disposed to permit the continuous cooling channel to extend through the sidewall.

5. The apparatus of claim 4, wherein the sidewall adjacent to either the first sidewall opening or second sidewall opening is sealed to the heat exchanger tube.

6. The apparatus of claim 5, wherein the heat exchanger tube is a bushing tube, the bushing tube having a first flanged end and an opposite second end.

7. The apparatus of claim 6, wherein the first flanged end has an outer diameter greater than at least one of the first sidewall opening or second sidewall opening, and wherein the opposite second end is configured and disposed to accept a connector.

8. The apparatus of claim 7, wherein the connector includes a terminal portion having an outer diameter greater than the second sidewall opening.

9. The apparatus of claim 8, wherein the apparatus further includes at least one fastener assembly that seals the terminal portion to the pouch sidewall.

10. A method of manufacturing an energy storing apparatus, the method comprising the steps of:
   a) providing a generally planar anode having a first hole therethrough, the first hole having a first diameter;
   b) providing a generally planar cathode having a second hole therethrough, the second hole having a second diameter;
   c) providing a generally planar separator having a third hole therethrough, the third hole having a third diameter;
   d) inserting the separator between the anode and the cathode to thereby form a stack, such that the first, second, and third holes are generally aligned with each other to form a continuous channel oriented substantially perpendicular to the plane of each anode, cathode and separator;
   e) inserting a heat exchanger tube through the first, second and third holes; and
   f) securing each end of the heat exchanger tube to thereby create a cell stack having a continuous channel therethrough.

11. The method according to claim 10, wherein the step of inserting the heat exchanger tube comprises inserting a thermally conductive and electrically insulating tube.

12. The method according to claim 11, wherein the step of inserting the heat exchanger tube comprises inserting a bushing tube having a first end having an outer diameter larger than at least one of the first hole in the generally planar anode, the first hole in the generally planar cathode, or the first hole in the generally planar separator.

13. The method according to claim 12, wherein the step of securing each end of the heat exchanger tube includes attaching a connector to a second end of the heat exchanger tube opposite the first end of the heat exchanger tube.

14. The method according to claim 13, further comprising the step of the inserting the cell stack into a pouch, the pouch having at least two sidewall openings aligned with the heat exchanger tube.

15. The method according to claim 14, further comprising the step of sealing each of the sidewall openings to the heat exchanger tube to form a pouched cell having a continuous channel therethrough.

16. The method according to claim 15, further comprising the step of providing a heat exchanging medium for circulating through the continuous channel of the pouched cell.

17. The method of claim 15, further comprising the step of adding an electrolyte to the pouched cell.

18. An energy storing apparatus manufactured according to the process of:
   a) providing a generally planar anode having a first through hole, the first hole having a first diameter;
   b) providing a generally planar cathode having a second through hole, the second hole having a second diameter;
   c) providing a generally planar separator having a third through hole, the third hole having a third diameter;
   d) stacking the separator between the anode and the cathode to thereby form a cell stack, such that the first, second, and third holes are generally aligned with each other to form a continuous channel oriented substantially perpendicular to the plane of each anode, cathode and separator;
   e) inserting an elongated bushing tube through the first, second and third holes, the bushing tube having a flanged first end, and an opposite second end;
   f) inserting the stack into a pouch, the pouch having a sidewall comprising a first pouch opening aligned with the flanged first end and an opposite second pouch opening aligned with the opposite second end; and
   g) sealing the foil pouch to the flanged first end and to the second end.

19. The apparatus of claim 18, wherein the step of sealing the foil pouch to the flanged first end comprises ultrasonic sealing.

20. The apparatus of claim 18, wherein the step of sealing the foil pouch to the flanged first end comprises providing a fastener assembly having a flexible cushioned ring and at least one retainer for engaging the pouch sidewall and the flanged first end.

* * * * *